C. F. HEINKEL & J. MUTH.
METHOD OF UNITING MATERIALS.
APPLICATION FILED NOV. 12, 1909.
1,043,831.
Patented Nov. 12, 1912.
3 SHEETS—SHEET 1.
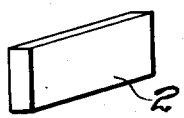
Fig. I
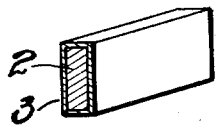
Fig. II
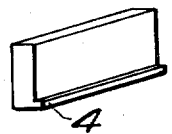
Fig. III
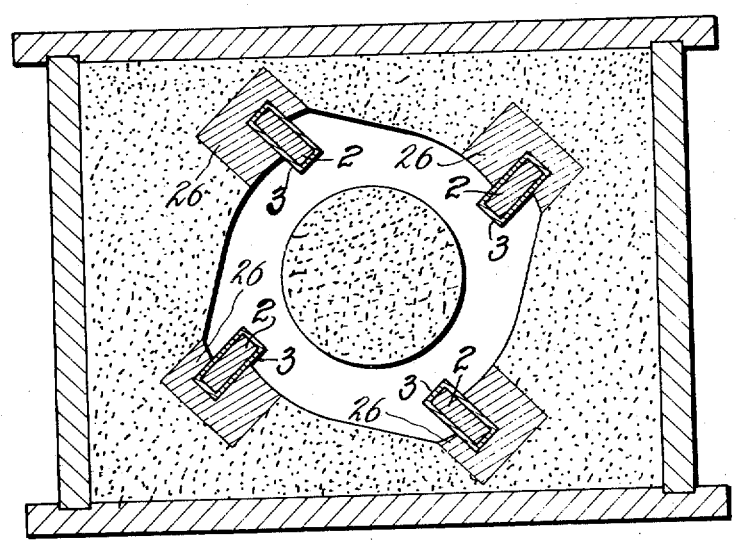
Fig. IV
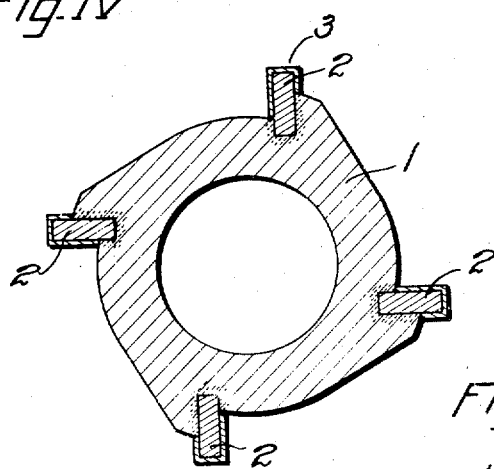
Fig. V
Witnesses:
Henry P Sydow
Julian F Sadowski
Inventors:
Christian F. Heinkel
John Muth

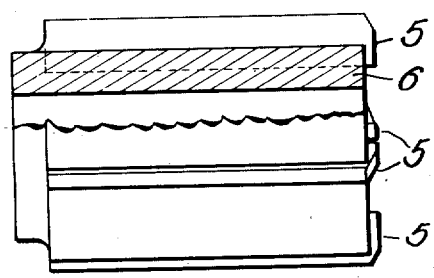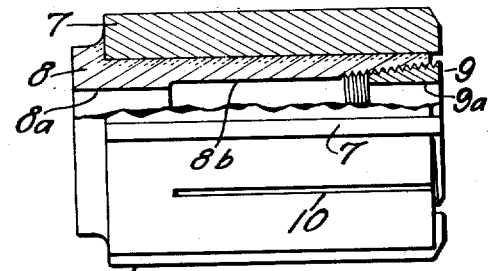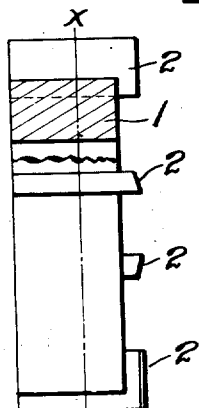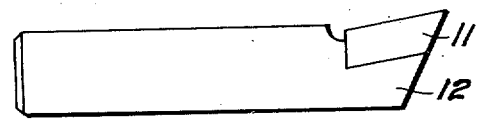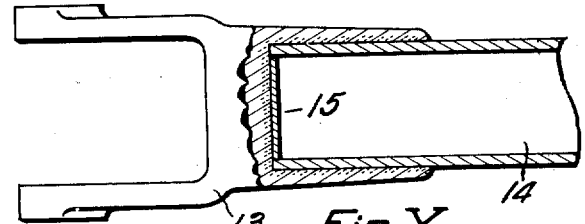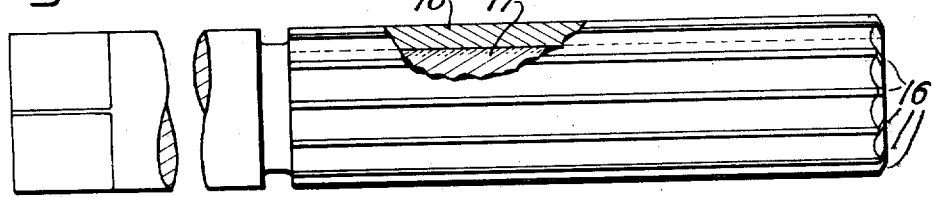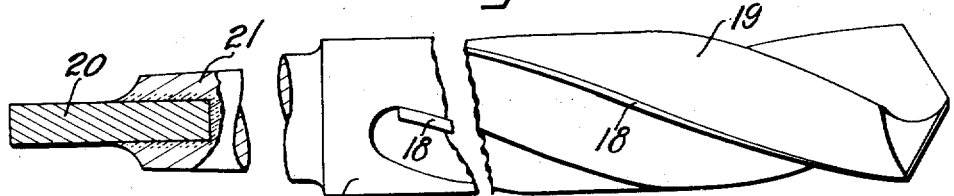

C. F. HEINKEL & J. MUTH.
METHOD OF UNITING MATERIALS.
APPLICATION FILED NOV. 12, 1909.
1,043,831.
Patented Nov. 12, 1912.
3 SHEETS—SHEET 3.
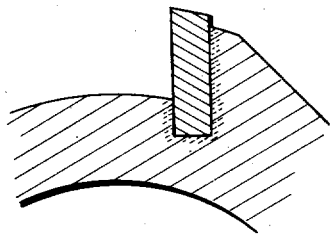
Fig. XIII
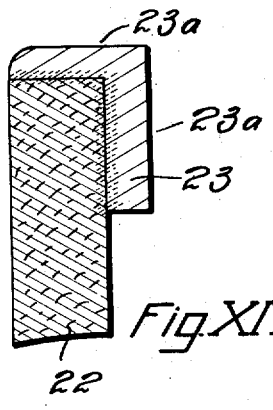
Fig. XIV
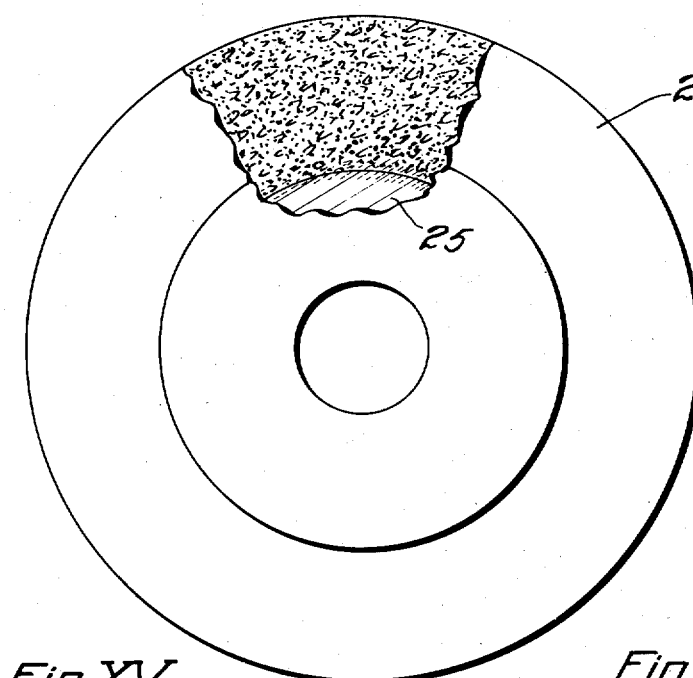
Fig. XV
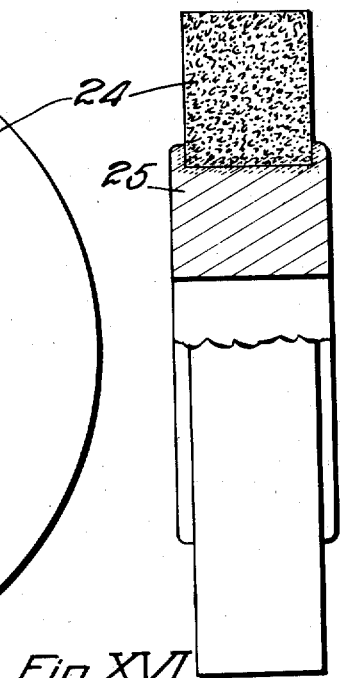
Fig. XVI
Witnesses:
Henry R Sydow
Julian F Sadowski
Inventors:
Christian F. Heinkel
John Muth

UNITED STATES PATENT OFFICE.

CHRISTIAN F. HEINKEL AND JOHN MUTH, OF CLEVELAND, OHIO; SAID MUTH ASSIGNOR TO SAID HEINKEL.

METHOD OF UNITING MATERIALS.

1,043,831.  Specification of Letters Patent.  Patented Nov. 12, 1912.

Application filed November 12, 1909. Serial No. 527,672.

*To all whom it may concern:*

Be it known that we, CHRISTIAN F. HEINKEL and JOHN MUTH, residing at Cleveland, in the county of Cuyahoga and State of Ohio, have invented a new and useful Method of Uniting Materials, of which the following is a specification.

Our invention relates to methods of uniting materals in which similar or dissimilar materials can be united by melting one or more of said materials and casting same to the other or others of the said materials, without materially changing or altering their physical property or condition.

The object of our invention is a cheap and efficient method of uniting or joining materials, and to form a better and more permanent joint or bond between the said materials than heretofore.

We attain this object, generally speaking, by coating one or more materials with a binder and casting one or more materials thereto; the binder and the body material adjacent to the solid piece being so proportioned as to bulk and composition, to fuse the binder and cause it to mix with the molten material while casting.

The methods of uniting materials by casting heretofore employed depend upon the molten material to impart sufficient heat to the solid material to fuse its surface and thus unite with the molten material, aided, in some cases, by a flux or a thin coating over the solid material, for the purpose of preventing oxidation; the disadvantages of these methods are that the physical properties or conditions of the solid pieces are changed, and the solid material weakened; for instance, the cutters of a cutting tool, made of carbon steel, will be burned when casting a cast iron or cast steel body thereto; or if the cutters are made of self hardening steel, and hardened before casting, the heat imparted to them by the molten body material will soften them and render them unfit for use; if these cutters are placed in the mold before they are hardened, it is almost impossible to harden them after casting, as the body material may fuse before the cutters are sufficiently heated for proper hardening; or if the fork shown in Figure X is cast to the tube by the older methods and the tube is rather thin, the wall may burn through; or, as is generally known, a joint thus made will weaken the tube very much, and for that reason such joints have not been used to any extent, as for instance in automobile and the like construction, where light weight is essential. Likewise in cases of pieces being cast in or shrunk in without welding at the joint these same difficulties will appear. To overcome these difficulties, we coat the piece of material to which another piece of material is to be cast with a binder which is so proportioned, as to bulk or composition or both, to be fused and mix with the molten material; the molten material immediately surrounding the solid pieces of material may also be so proportioned to aid the said binder, so that when the molten material, while casting, comes in contact with the binder, it imparts sufficient heat to the binder to fuse it and cause it to mix with the molten material, and by the time the binder is so fused, the molten material immediately surrounding the binder will have cooled sufficiently so as not to affect the solid material materially; thus, the material to which another material is cast, does not change its physical condition or property or its form to any detrimental extent; the binder in this invention performs a function similar to the glue between two pieces of wood.

In the drawings accompanying: Fig. I is a perspective-view of a cutting-blade for a milling-cutter. Fig. II is a sectional perspective-view of the cutting-blade of Fig. I with the binder coated thereon. Fig. III is a modification of a cutting-blade. Fig. IV is a section through the mold for a milling-cutter, showing the cutting-blades and chills in place in the mold and ready for pouring of the molten material; section is taken on line $x$—$x$ of Fig. VIII. Fig. V is a section of the milling-cutter as it is taken out of the mold after casting; section is taken on line $x$—$x$ of Fig. VIII. Fig. VI is a side-view of a shell-reamer, partly broken away to show the cutting-blades in place. Fig. VII is a side-view of an adjustable shell-reamer, partly broken away to show the cutting-blades united to the body, and to further show the adjusting means. Fig. VIII is a side-view of a milling-cutter, partly broken away; this figure shows the finished product of Figs. I, II, IV, and V. Fig. IX is a side-view of a lathe or planer tool. Fig. X is a side-view of a fork partly broken away to show the tube united thereto. Fig. XI is a side-view of a hand-reamer, partly broken away to show the cutting-blades united to the body. Fig. XII is a side-view of a twist-drill, partly broken away to show the tang united to the shank. Fig. XIII is a section through a cutting-blade and a portion of the body; this figure illustrates the general relation of the cutting-blades and the bodies of the several reamers and milling-cutters previously shown. Fig. XIV is a section of a carbon brush for a dynamo with another material united thereto. Fig. XV is an end-view of a grinding-wheel, partly broken away to show abrasion-material united to the body. Fig. XVI is a side-view of Fig. XV, partly broken away to show abrasion material united to the body.

Similar numerals refer to similar parts throughout the several views.

This method of uniting materials is applicable to a variety of objects and purposes, several of which are illustrated, generally only, in the drawings, but in order to have this invention easily understood we have particularly shown in Figs. I, II, IV, and V, and will now particularly describe in connection with said figures, the method of uniting the cutting-blades to the body of a milling-cutter; the other figures of the drawings show several applications of this invention, and any one, skilled in the art, should be able to apply this invention for the purpose of uniting any materials.

Referring particularly to Figs. I, II, IV and V which show this invention applied to a milling-cutter (the finished cutter being shown in Fig. VIII), a pattern of suitable material, corresponding to the form of the body 1 is made and is provided with core-prints corresponding to that part of the cutting-blades 2 which project outside of the said body. The cutting-blades 2, preferably of high-speed steel, are first formed, they are then heated and hardened somewhat harder than necessary for cutting purposes, the reason therefor will appear hereinafter; after cutting-blades 2 are heated, and while cooling in the hardening process, a binder 3 is applied to the cutting-blades 2 by plating, or dipping in molten binder material, or by any other means; the binder 3 must adhere firmly to the cutting-blades 2, and should be a material, or a composition of materials, which melts at a lower temperature than the material of the body 1, as will appear hereinafter; a preferred method of hardening the cutting-blades and applying the binder thereto consists in, first, heating the cutting-blades to the proper temperature for hardening, second, dipping the so heated cutting-blades into an acid, either in liquid acid such as boracic acid, or in solid or granular acid such as borax, and leaving there until sufficient heat remains in the cutting-blades to cause the binder to adhere firmly, third, removing the cutting-blades from the said acid and applying the binder; by dipping the cutting-blades in acid they become very hard, as well as being cleaned for the reception of the binder. If air-hardening steel is used in the cutting-blades the hardening thereof, previous to placing the same in the mold, may be omitted, but we prefer to heat such cutting-blades sufficiently to cause the binder to adhere firmly. A mold is then made with the said pattern in sand or otherwise, the cutting-blades 2 with their coat of binder are then inserted into the said core-prints of this mold, and the molten material for body 1 is then poured into the said mold. Said molten material, coming in contact with, and imparting some of its heat to the binder 3 which melts at a lower temperature than the material of the body as previously mentioned, will fuse or melt the said binder; the said molten material of the body 1 and the now fused or molten binder will mix or unite, and, after cooling, will form a solid and permanent bond between the body 1 and the cutting-blades 2. Some of the heat of the molten material which is poured into the mold will also be imparted to the cutting-blades 2, and thereby draw their temper somewhat, for that reason the cutting-blades 2 were originally hardened somewhat harder than necessary for cutting purposes as previously mentioned.

After the tool has cooled it is removed from the mold and will appear similar to Fig. V; it is then finished by grinding or otherwise and will then appear similar to Fig. VIII. We prefer to remove the tool from the mold immediately after it has set and while still hot and subject it to a cooling means such as an air-blast or an oil bath so as to prevent annealing or drawing the temper too much.

The binder 3 may be of any material, or of any composition of materials; we find that copper is a good binder-material when the material of the body requires a high temperature for melting, as for instance cast-steel; zinc, tin, lead, aluminum and the like materials, or any combination thereof, or a combination of any or all of the above with copper, or with any other material or materials which require a rather high temperature for fusing or melting, may be employed when the body-material requires a lower temperature for melting.

Judgment must be exercised so that the binder will fuse or melt, but not burn up from the heat imparted to it by the molten body-material; it is impossible to give a specific binder-material or binder-alloy for all purposes, or for any particular body-material, in as much as the amount of molten material surrounding the binder may be large or small, or the temperature required to melt the body-material may be large or small, and therefore impart more or less heat to the binder; the binder to be used should be suited to the temperature at which the body-material melts and to the amount of body-material surrounding the binder; if the binder fuses or melts at a low temperature and the body-material melts at a high temperature, or a large quantity of body-material surrounds the cutting-blades, the binder may burn up and leave an oxid between the cutting-blades and the body, and a good bond will not be formed.

Either the binder, or the body material adjacent thereto, or both, should be so proportioned, as to bulk and composition, that the binder will fuse and mix with the body material while casting without imparting sufficient heat to the solid piece of material to seriously affect its physical condition or property, as for instance drawing the temper of the cutters, or burning or otherwise weakening the tube shown in Fig. X; applying an acid, or a chlorid, or a cyanid upon the surface of the solid pieces, or the ordinary tinning of the surface, as done heretofore is insufficient for the purpose of this invention, as such methods prevent oxidation only and do not have sufficient body for a good bond; we desire to form a bond through the binder which adheres firmly to the solid pieces and mixes with the molten material while casting; the molten material does not take hold of the solid material directly, but does so indirectly through the binder.

It may be noted here that, although the mold may be considered air-tight and no oxidation takes place while pouring, a little aluminum added to the binder, particularly a copper or part copper binder, will check oxidation to a considerable extent.

Any materials may be united by this method, and the several applications of this method illustrated in the drawings will now be described briefly.

The cutting-blade shown in Fig. III has a toe 4 which helps to hold the said cutting-blades in the body by presenting a larger binder-area to the body-material.

The shell-reamer shown in Fig. VI has cutting-blades 5 united to the body 6; any number of cutting-blades may be united to the body, and a transverse section through any of the cutting-blades will appear similar to Fig. XIII.

The adjustable shell-reamer shown in Fig. VII has cutting-blades 7 united to the body 8, and further has an adjusting-cone 9 threaded to the body 8, and two or more slits 10 so that, when manipulating the said adjusting-cone 9, the front part of body 8 and cutting-blades 7 can spring in or out, or, in other words, increase or decrease the diameter of the reamer; a transverse section through any of the cutting-blades will appear similar to Fig. XIII; these reamers, preferably, have face $8^a$ and the opening $9^a$ fit to the arbor or shank, and body 8 is, particularly in large reamers, cut away or relieved as at $8^b$, to reduce the material surrounding the cutting-blades 7 as well as permitting more spring, and therefore more adjustment, to the cutting-blades 7.

Fig. VIII shows the finished milling-cutter particularly illustrated and described in connection with Figs. I, II, IV, and V; we therefore apply the same reference numerals thereto.

The lathe or planer tool shown in Fig. IX has the cutting-blade 11 united to the body 12.

Fig. X shows a fork 13 united to a tube 14; a stop-plate 15 should be placed either on the end of tube 14 as shown, or some distance back of, or in from, the end of the tube 14, so that the molten material may run some distance into the said tube and thereby present more binding surface between the two materials, as well as supporting the said tube inside as well as outside, thus producing a better and stronger joint; the binder in this case may be integrally united to the tube by brazing, or plating, or any other similar means; or the binder may be laid around the tube and on the stop-plate, and the heat of the molten material may be employed to integrally unite the binder to the tube.

The hand-reamer shown in Fig. XI has cutting-blades 16 united to the body 17.

The twist-drill shown in Fig. XII has the cutting-blades 18 united to the body 19, and the tang 20 to shank 21; reference is to be had to our pending application for drills, filed Oct. 24th, 1908, Serial Number 459,381, which shows drills with cutting-blades.

Fig. XIII shows a section of a cutting-blade and a portion of a body, and is intended to show our preferred relation of the cutting-blade to the body of a cutting-tool, such as reamers, milling-cutters, core-drills, and the like, and to answer the purpose of end-views of Figs. VI, VII, VIII, and XI.

Fig. XIV shows a carbon dynamo brush 22 united to a metal back 23; it is well known in the art that, when an electric current leaves a carbon brush, or in other words when an electric current passes from the carbon brush to the brush-holder, the carbon brush being porous, a number of arcs are formed between the brush and the holder, thus causing heat and dissipation of energy; by uniting a metal back to the brush by means of a binder these arcs are eliminated, as either or both faces $23^a$ can be finished smoothly to form a good contact with the brush-holder.

In Figs. XV and XVI we show an abrasive or grinding-wheel which has an abrasive ring 24 united to a body or hub 25; these wheels are now made of abrasive material throughout and have a light coat of lead or babbitt around the central opening to fit to the arbor; such a wheel is held and driven by collars or washers screwed against its sides; this clamping and driving causes strains in the wheel and possible fracture which is dangerous, particularly when the wheel is running at a high rate of speed; by casting a hub or body to the abrasive ring, holding and driving is accomplished through the hub or body and the abrasive material is left in its natural condition; the danger of the wheel breaking from clamping or driving is thus eliminated; this method will also save considerable abrasive material, as the body-material is cheaper than the abrasive material, and, the wheel being used down to the diameter of the collars or flanges only, the body-material thus discarded is less expensive than the abrasive material which would otherwise be discarded; the binder in this wheel, as well as in the carbon brush previously mentioned can be applied by plating, or by laying the binder on the face or faces to be united and integrally uniting the binder to the abrasive material by means of the heat of the molten body-material, or by melting the binder-material and pouring it upon the surface or surfaces which are to be united to the body; carbon and the abrasive materials being porous, the molten material will readily enter the pores and adhere firmly; the method of procedure for this grinding-wheel is as follows: A pattern is made conforming to the finished wheel, a mold is made with said pattern, the abrasive part 24, previously made and with binder applied or laid in place, is then placed in the said mold similar to a core, and the molten body-material is then poured into the said mold, after cooling the complete wheel is taken from the said mold and finished as the case may require.

For probable convenience of manufacture the cutting-blades are shown (see Fig. II) with the binder applied over their entire surface, but it should be understood that the binder needs to be applied only to the faces which are to be united with another material.

Instead of coating the cutting-blades, or the surface of any other material which is to be united with another material, with a binder, a binder may be placed in the mold and adjacent to the face which is to be united with the molten material; the heat from the molten material will fuse or melt the said binder and integrally unite and form a permanent bond between the materials; the faces of the binder and the adjacent faces of the material should be cleaned, preferably with acid.

It should be noted that, in large cutting-tools for instance, in which the cutting-blades are comparatively small in relation to the body, chill-plates 26 should be employed which divert some of the heat and thereby prevent the binder from burning up, or prevent the cutting-blades from annealing, or both; or that, in case a large quantity of molten material is to be cast to a thin, or much less bulky material, chill-plates 26 should be employed to divert some of the heat of the molten material from the thinner material, and thereby prevent the thinner material from burning up or being weakened by the heat. It should further be noted that materials other than metals, and that any number of materials may thus be united; for instance, a 5 pointed star may be made with 5 different materials composing the points and a 6th material composing the body; or the 6 points of a 6-pointed star may be composed of different materials, all verging to a point, and alternate points being cast to the others.

It will be seen that this invention is basic or generic, and has a wide range of application; the applications shown and described are examples only, and are mentioned only material, comes within the spirit and intent of this invention; any procedure which applies a binder to one or more materials and casts one or more materials thereto, thus fusing or melting the said binder, and thereby either causing the said fused or molten binder to mix, or unite with the said molten casting-material, or causing the said fused or molten binder to integrally unite with one material and mix or unite with another material, comes within the spirit and intent of this invention; any one skilled in the art should be able, after perusal of this specification and these drawings, to apply the spirit and intent of this invention for any purpose of uniting materials, in as much as detailed steps are given in connection with a milling-cutter and an abrasive or grinding-wheel, and several general applications of this method are illustrated and pointed out.

We claim:

1. The method of uniting one or more pieces of material to a casting, which method consists in coating a surface of each of said piece or pieces of material with a binder, in molding said casting with a core-print for each of said piece or pieces of material, in placing said piece or pieces of material into said core-prints, in pouring said casting, and in cooling said casting after said binder has fused and mixed with a layer of the casting material but before the heat radiated by said casting material changes the physical condition or property of said piece or pieces of material.

2. The method of uniting one or more pieces of material to a casting, which method consists in coating a surface of each of said piece or pieces of material with a binder, in molding said casting with a core-print for each of said piece or pieces of material, in arranging the mold to surround said binder with sufficient casting material to fuse said binder, in placing said piece or pieces of material into said core-prints, in pouring said casting, and in cooling said casting after said binder has fused and mixed with a layer of the casting material but before the heat radiated by said casting material changes the physical condition or property of said piece or pieces of material.

3. The method of uniting one or more pieces of material to a casting, which method consists in coating a surface of each of said piece or pieces of material with a binder, in molding the end-face of said casting with a core-print for each of said piece or pieces of material and the outer or circumferential face with core-prints for one or more chills, in forming said chill or chills with a recess adapted to receive the outer or circumferential portion of said piece or pieces of material, in placing said chill or chills into said core-prints provided for that purpose, in placing said piece or pieces of material into said core-prints provided for that purpose, the outer or circumferential portion of said piece or pieces of material entering said recess, in pouring said casting, and in cooling said casting after said binder has fused and mixed with a layer of the casting material but before the heat radiated by said casting material changes the physical condition or property of said piece or pieces of material.

4. The method of uniting one or more pieces of material to a casting, which method consists in coating a surface of each of said piece or pieces of material with a binder, in molding the end-face of said casting with a core-print for each of said piece or pieces of material, and the outer or circumferential face with core-prints for one or more chills, in arranging the mold to surround said binder with sufficient casting material to fuse said binder in forming said chill or chills with a recess adapted to receive the outer or circumferential portion of said piece or pieces of material, in placing said chill or chills into said core-prints provided for that purpose, in placing said piece or pieces of material into said core-prints provided for that purpose, the outer or circumferential portion of said piece or pieces of material entering said recess, in pouring said casting, and in cooling said casting after said binder has fused and mixed with a layer of the casting material but before the heat radiated by said casting material changes the physical condition or property of said piece or pieces of material.

5. The method of uniting the cutters to the body of a cutting tool, which method consists in coating a surface of each of said cutters with a binder, in molding said body with core-prints for said cutters, in placing said cutters into said core-prints, in pouring said body, and in cooling said tool after said binder has fused and mixed with a layer of the casting material but before the heat radiated by said casting material changes the physical condition or property of said cutters.

6. The method of uniting the cutters to the body of a cutting tool, which method consists in coating a surface of each of said cutters with a binder, in molding said body with a core-print for each of said cutters, in arranging the mold to surround said binder with sufficient casting material to fuse said binder, in placing said cutters into said core-prints, in pouring said body, and in cooling said tool after said binder has fused and mixed with a layer of the body material but before the heat radiated by said casting material changes the physical condition or property of said cutters.

CHRISTIAN F. HEINKEL.
JOHN MUTH.

Witnesses:
HENRY R. SYDON,
JULIAN T. SADOWSKI.

It is hereby certified that in Letters Patent No. 1,043,831, granted November 12, 1912, upon the application of Christian F. Heinkel and John Muth, of Cleveland, Ohio, for an improvement in "Methods of Uniting Materials," an error appears in the printed specification requiring correction as follows: Page 4, line 97, strike out the words "material, comes within," and insert the words *as an aid to understand;* and that the said Letters Patent should be read with this correction therein that the same may conform to the record of the case in the Patent Office.

Signed and sealed this 7th day of January, A. D., 1913.

[SEAL.]

C. C. BILLINGS,
*Acting Commissioner of Patents.* the physical condition or property of said piece or pieces of material.

2. The method of uniting one or more pieces of material to a casting, which method consists in coating a surface of each of said piece or pieces of material with a binder, in molding said casting with a core-print for each of said piece or pieces of material, in arranging the mold to surround said binder with sufficient casting material to fuse said binder, in placing said piece or pieces of material into said core-prints, in pouring said casting, and in cooling said casting after said binder has fused and mixed with a layer of the casting material but before the heat radiated by said casting material changes the physical condition or property of said piece or pieces of material.

3. The method of uniting one or more pieces of material to a casting, which method consists in coating a surface of each of said piece or pieces of material with a binder, in molding the end-face of said casting with a core-print for each of said piece or pieces of material and the outer or circumferential face with core-prints for one or more chills, in forming said chill or chills with a recess adapted to receive the outer or circumferential portion of said piece or pieces of material, in placing said chill or chills into said core-prints provided for that purpose, in placing said piece or pieces of material into said core-prints provided for that purpose, the outer or circumferential portion of said piece or pieces of material entering said recess, in pouring said casting, and in cooling said casting after said binder has fused and mixed with a layer of the casting material but before the heat radiated by said casting material changes the physical condition or property of said piece or pieces of material.

4. The method of uniting one or more pieces of material to a casting, which method consists in coating a surface of each of said piece or pieces of material with a binder, in molding the end-face of said casting with a core-print for each of said piece or pieces of material, and the outer or circumferential face with core-prints for one or more chills, in arranging the mold to surround said binder with sufficient casting material to fuse said binder in forming said chill or chills with a recess adapted to receive the outer or circumferential portion of said piece or pieces of material, in placing said chill or chills into said core-prints provided for that purpose, in placing said piece or pieces of material into said core-prints provided for that purpose, the outer or circumferential portion of said piece or pieces of material entering said recess, in pouring said casting, and in cooling said casting after said binder has fused and mixed with a layer of the casting material but before the heat radiated by said casting material changes the physical condition or property of said piece or pieces of material.

5. The method of uniting the cutters to the body of a cutting tool, which method consists in coating a surface of each of said cutters with a binder, in molding said body with core-prints for said cutters, in placing said cutters into said core-prints, in pouring said body, and in cooling said tool after said binder has fused and mixed with a layer of the casting material but before the heat radiated by said casting material changes the physical condition or property of said cutters.

6. The method of uniting the cutters to the body of a cutting tool, which method consists in coating a surface of each of said cutters with a binder, in molding said body with a core-print for each of said cutters, in arranging the mold to surround said binder with sufficient casting material to fuse said binder, in placing said cutters into said core-prints, in pouring said body, and in cooling said tool after said binder has fused and mixed with a layer of the body material but before the heat radiated by said casting material changes the physical condition or property of said cutters.

CHRISTIAN F. HEINKEL.
JOHN MUTH.

Witnesses:
HENRY R. SYDON,
JULIAN T. SADOWSKI.

It is hereby certified that in Letters Patent No. 1,043,831, granted November 12, 1912, upon the application of Christian F. Heinkel and John Muth, of Cleveland, Ohio for an improvement in "Methods of Uniting Materials," an error appears in the printed specification requiring correction as follows: Page 4, line 97, strike out the words "material, comes within," and insert the words *as an aid to understand;* and that the said Letters Patent should be read with this correction therein that the same may conform to the record of the case in the Patent Office.

Signed and sealed this 7th day of January, A. D., 1913.

[SEAL.]

C. C. BILLINGS,
*Acting Commissioner of Patents.*

It is hereby certified that in Letters Patent No. 1,043,831, granted November 12, 1912, upon the application of Christian F. Heinkel and John Muth, of Cleveland, Ohio for an improvement in "Methods of Uniting Materials," an error appears in the printed specification requiring correction as follows: Page 4, line 97, strike out the words "material, comes within," and insert the words *as an aid to understand;* and that the said Letters Patent should be read with this correction therein that the same may conform to the record of the case in the Patent Office.

Signed and sealed this 7th day of January, A. D., 1913.

[SEAL.]

C. C. BILLINGS,
*Acting Commissioner of Patents.*